Patented May 4, 1937

2,079,450

UNITED STATES PATENT OFFICE 2,079,450

AMINO-CHLORODIPHENYL DERIVATIVES

Morton Harris, Anniston, Ala., assignor, by mesne assignments, to Monsanto Chemical Company, a corporation of Delaware No Drawing. Application March 21, 1935, Serial No. 12,251

9 Claims. (Cl. 260—130.5)

The present invention comprises derivatives of chlorodiphenyl, particularly the 2-amino-4'-chloro derivative and compounds thereof.

I have found that 2-nitro-4'-chlorodiphenyl can be reduced by iron and hydrochloric acid to give good yields of 2-amino-4'-chlorodiphenyl. The following method may be employed:

Six hundred and fifty grams of 2-nitro-4'-chlorodiphenyl obtained from the nitration product of 4-chlorodiphenyl, 650 grams of treated iron, and 475 grams of benzol are charged into a reducer equipped with a stirrer, and the mixture is heated and stirred under reflux for an hour. (The treated iron is prepared by adding strong hydrochloric acid, 69 grams, and 20 grams water to 500 grams of iron filings, followed by drying in the cold.) One hundred and forty-two cubic centimeters of water are then added in 14-c. c. portions, every fifteen minutes. After all of the water has been added, the refluxing and stirring are continued for two more hours and then the mixture is allowed to stand overnight.

The reduction product is then treated under reflux with 300 c. c. of 15% soda ash solution for thirty minutes. The benzol layer containing the amine is then separated from the extraction mixture and filtered. The amine is recoverd from the benzol solution by adding thereto an excess of 10% sulfuric acid. The sulfate of 2-amino-4'-chlorodiphenyl is precipitated, filtered and sucked dry on a Buchner filter.

In case some unreduced nitro compounds are still present in the product, it is again suspended in benzol, vigorously stirred, and filtered dry.

Traces of insoluble matter may now be removed by bringing the product to a boil in 3 liters of 10% sulfuric acid. The hot acid solution is filtered to remove the precipitate (probably the sulfate of 4-amino-4'-chlorodiphenyl) and then the filtrate allowed to cool. Large needle-like crystals of the sulfate of 2-amino-4'-chlorodiphenyl are obtained. The crystals are filtered off and then washed with water.

The amine sulfate may be converted back to the free amine by stirring with one liter of boiling 25% sodium hydroxide solution. This decomposition of the amine sulfate is very slow and usually several hours are required for complete conversion. It was found that this time can be decreased by the addition of some ammonium hydroxide.

The free amino-chlorodiphenyl separates as an oil which crystallizes upon standing overnight. The amine crystals are filtered off, washed with water and vacuum distilled. Four hundred and fifteen grams of 2-amino-4'-chlorodiphenyl boiling at 162°–165° C. at 3–4 m. m. were obtained The distilled amine is purified by dissolving in 500 c. c. of 95% alcohol and allowing to crystallize overnight. The crystals are filtered off and washed with alcohol. They may then be vacuum dried. Melting point=46.8–47.2° C. Yield=245 grams. This compound has the structure:

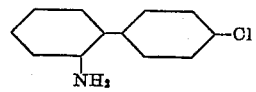

Additional quantities of the amine can be recovered by working up the mother liquor from the crystallizations.

Sulfate of 2-amino-4'-chlorodiphenyl

Ten grams of 2-amino-4'-chlorodiphenyl are dissolved in 250 c. c. of boiling 5% sulfuric acid and allowed to slowly crystallize. The needle-like crystals of the amine sulfate are filtered off, washed with water and vacuum dried. Analysis=19.12% $H_2SO_4$. Theory for normal sulfate=19.35% $H_2SO_4$. This compound has the structure:

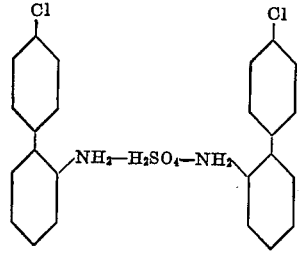

Hydrochloride of 2-amino-4'-chlorodiphenyl

Ten grams of 2-amino-4'-chlorodiphenyl are dissolved in 250 c. c. of 5% HCl solution and allowed to crystallize. Fine, fiber-like needle crystals are obtained. These are filtered off and vacuum dried. The hydrochloride hydrolyzes readily in water and should not be washed with water.

Analysis=15.13% HCl.
Theory=15.16% H.
This compound has the structure:

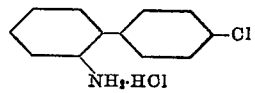

Nitrate of 2-amino-4'-chlorodiphenyl

Ten grams of 2-amino-4'-chlorodiphenyl are heated to boiling with 250 c. c. of 5% nitric acid solution. Additional amounts of water are added in small amounts until solution is complete. The amine nitrate is allowed to crystallize slowly, the needle-like crystals are filtered off, washed with water and vacuum dried.

Analysis=23.28% $HNO_3$.
Theory=23.60% $HNO_3$.

This compound has the structure:

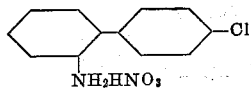

The 2-amino-4'-chlorodiphenyl and its derivatives may be employed for a variety of purposes, such as in rubber accelerators, anti-oxidants for rubber, gasoline and other hydrocarbon products, or as raw materials for various dyes and pharmaceuticals. Being crystalline material, the new compounds herein described may be flaked or spheroidized for convenience in shipment or in use.

Having now particularly described my invention and the manner in which it may be made, I am desirous that it not be limited except as indicated by the prior art or as particularly pointed out in the claims.

What I claim is:

1. As a new compound, 2-amino-4'-chlorodiphenyl having a melting point of approximately 46.8° C. to 47.2° C. and which may be obtained by the reduction of the corresponding nitro compound.

2. A compound having the structure:

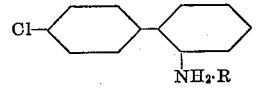

where R is a mineral inorganic acid.

3. A compound having the structure:

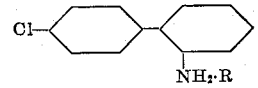

where R is one of the group consisting of the following $H_2SO_4$, HCl, and $HNO_3$.

4. As a new compound, the sulfuric acid addition salt of 2-amino-4'-chlorodiphenyl.

5. As a new compound, the hydrochloride of 2-amino-4'-chlorodiphenyl.

6. As a new product, 2-amino-4'-chlorodiphenyl having a melting point of approximately 46.8°–47.2° C., said product being in flake form.

7. As a new product, an inorganic acid addition salt of 2-amino-4'-chlorodiphenyl in flake form.

8. As a new chemical compound, a material selected from a class consisting of 2-amino-4'-chlorodiphenyl having a melting point of 46.8 to 47.2° C. and the inorganic acid addition salts of said 2-amino-4'-chlorodiphenyl.

9. A process of preparing 2-amino-4'-chlorodiphenyl having a melting point of 46.8–47.2° C. which comprises reducing 2-nitro-4'-chlorodiphenyl with iron in the presence of a strong mineral acid, neutralizing the resulting reaction mixture and recovering the amine therefrom.

MORTON HARRIS.

CERTIFICATE OF CORRECTION.

Patent No. 2,079,450. May 4, 1937.

MORTON HARRIS.

It is hereby certified that error appears in the printed specification of the above numbered patent requiring correction as follows: Page 1, second column, line 50, for "H." read HCl.; and that the said Letters Patent should be read with this correction therein that the same may conform to the record of the case in the Patent Office.

Signed and sealed this 29th day of June, A. D. 1937.

Henry Van Arsdale (Seal) Acting Commissioner of Patents.